(12) United States Patent
Hanusch

(10) Patent No.: US 8,521,590 B1
(45) Date of Patent: Aug. 27, 2013

(54) SYSTEMS AND METHODS FOR ASSESSING CONSUMERS' PRODUCT BRAND LOYALTY

(76) Inventor: Denise Larson Hanusch, Levitown, NY (US)

( * ) Notice: Subject to any disclaimer, the term of this patent is extended or adjusted under 35 U.S.C. 154(b) by 243 days.

(21) Appl. No.: 13/185,582

(22) Filed: Jul. 19, 2011

Related U.S. Application Data

(63) Continuation-in-part of application No. 12/498,046, filed on Jul. 6, 2009, now abandoned, which is a continuation-in-part of application No. 10/647,097, filed on Aug. 22, 2003, now abandoned.

(60) Provisional application No. 60/405,226, filed on Aug. 22, 2002.

(51) Int. Cl.
*G06Q 30/00* (2012.01)

(52) U.S. Cl.
USPC ...... 705/14.49; 705/14.4; 705/14.3; 705/7.11

(58) Field of Classification Search
USPC ............................. 705/14.49, 14.4, 14.3, 7.11
See application file for complete search history.

(56) References Cited

U.S. PATENT DOCUMENTS

| | | | | |
|---|---|---|---|---|
| 6,009,407 | A * | 12/1999 | Garg | 705/7.25 |
| 6,236,975 | B1 * | 5/2001 | Boe et al. | 705/7.32 |
| 6,609,104 | B1 * | 8/2003 | Deaton et al. | 705/14.39 |
| 6,772,104 | B1 * | 8/2004 | White et al. | 703/8 |
| 6,826,541 | B1 * | 11/2004 | Johnston et al. | 705/36 R |
| 7,062,510 | B1 * | 6/2006 | Eldering | 1/1 |
| 2002/0010620 | A1 * | 1/2002 | Kowalchuk et al. | 705/10 |
| 2003/0040952 | A1 * | 2/2003 | Keil et al. | 705/10 |

* cited by examiner

*Primary Examiner* — Peter Choi
*Assistant Examiner* — Darlene Garcia-Guerra
(74) *Attorney, Agent, or Firm* — Arent Fox LLP; Michael Fainberg

(57) ABSTRACT

Disclosed are systems and methods for assessing consumers' emotional attachment to product brand for targeted advertising, development of new products, valuation of products, brand marketing and other purposes. A method for determining consumer product brand loyalty is provided by quantifying a consumer's emotional attachment to a consumer product brand. The consumer's emotional attachment to a consumer product brand is indicated by the consumer's willingness to give up the consumer product brand. The willingness to give up the consumer product brand is measured, and applied to commercial uses such as advertising, marketing, product research and development and valuation of brands.

15 Claims, 12 Drawing Sheets

....everyone is most Attached to e-mail

| Access e-mail | 9.46 |
|---|---|
| Female | 9.52 |
| Male | 9.39 |
| H.S. grad or less | 9.16 |
| Some College | 9.40 |
| College grad + | 9.55 |
| East | 9.42 |
| South | 9.54 |
| North Central | 9.41 |
| West | 9.45 |
| 18-24 | 9.22 |
| 25-34 | 9.47 |
| 35-54 | 9.49 |
| 55+ | 9.63 |
| Kids/Students/Teens | 9.32 |
| "Fred" | 9.58 |
| Dabblers | 9.48 |
| Shoppers | 9.54 |

FIG 10

On a scale of 0 to 10, where "10" means you are unwilling to give up a brand and "0" means you are willing to give up the brand", how would you rate the brand?

| Brand 1 | 0 | 1 | 2 | 3 | 4 | 5 | 6 | 7 | 8 | 9 | 10 |
|---|---|---|---|---|---|---|---|---|---|---|---|
| Brand 2 | 0 | 1 | 2 | 3 | 4 | 5 | 6 | 7 | 8 | 9 | 10 |
| Brand 3 | 0 | 1 | 2 | 3 | 4 | 5 | 6 | 7 | 8 | 9 | 10 |
| Brand 4 | 0 | 1 | 2 | 3 | 4 | 5 | 6 | 7 | 8 | 9 | 10 |
| Brand 5 | 0 | 1 | 2 | 3 | 4 | 5 | 6 | 7 | 8 | 9 | 10 |
| Brand 6 | 0 | 1 | 2 | 3 | 4 | 5 | 6 | 7 | 8 | 9 | 10 |
| Brand 7 | 0 | 1 | 2 | 3 | 4 | 5 | 6 | 7 | 8 | 9 | 10 |
| Brand 8 | 0 | 1 | 2 | 3 | 4 | 5 | 6 | 7 | 8 | 9 | 10 |
| Brand 9 | 0 | 1 | 2 | 3 | 4 | 5 | 6 | 7 | 8 | 9 | 10 |
| Brand 10 | 0 | 1 | 2 | 3 | 4 | 5 | 6 | 7 | 8 | 9 | 10 |

Fig. 12

SYSTEMS AND METHODS FOR ASSESSING CONSUMERS' PRODUCT BRAND LOYALTY

CROSS-REFERENCE TO RELATED APPLICATIONS

This application is a continuation-in-part of U.S. application Ser. No. 12/498,046 filed Jul. 6, 2009, which is a continuation-in-part of U.S. application Ser. No. 10/647,097 filed Sep. 22, 2003, which claims the benefit of priority from U.S. Provisional Application Ser. No. 60/405,226, filed Aug. 22, 2002, all of which are incorporated by reference herein.

TECHNICAL FIELD

The present disclosure relates to the field of product marketing and, in particular, to systems and methods for assessing consumers' emotional attachment to product brand for targeted advertising, development of new products, valuation of products and other purposes.

BACKGROUND

It is well known that brand loyalty is an indicator of product success and profitability. Corporations covet customers loyal to a particular brand because studies have shown that the lifetime value of and cumulative profits derived from a loyal customer are greater than that of other customers. In addition, loyal customers are often willing to pay more for a favored brand.

Corporate executives, marketers and advertisers have developed several ways to assess brand loyalty. Known techniques include, for example, focus group testing, psychology-based surveys or predictive questioning. Other measures for assessing brand loyalty include, for example, product market share, brand preference, brands used most often, customer satisfaction, purchase frequency, or frequency of store or website visits.

While each of these techniques provides a measure of brand use, these techniques do not indicate the emotional attachment a consumer has to a brand. Consequently, loyal consumers who are not emotionally attached to a brand may not have a long lasting relationship with the brand, thereby having a negative impact on the sales, profitability and/or image of a brand. There may be other factors contributing to a seemingly loyal customer's use or purchase of a brand. For example, consumer loyalty data obtained based on purchase volume or frequency of store visits may be related to price or convenience, and not related to the consumer's loyalty to a brand. In this case, a change in brands due to events, such as price increase or store relocation, would make the prior data obtained based on purchase volume or frequency of store visits not accurate or relevant to assessing customers' brand loyalty.

SUMMARY

Disclosed are systems and methods for assessing consumers' emotional attachment to product brand for targeted advertising, development of new products, valuation of products, brand marketing and other purposes. The methodology for measuring brand loyalty disclosed herein is based on the psychological and sociological study of human behavior, particularly as it relates to right-brain vs. left-brain loyalty and mother/child relationships. This intense and comprehensive exploration into cognitive human behavior fields inspired the present inventor to create and develop the only "right-brain" academically grounded survey-based marketing and media consumer research standard that quantitatively measures brand loyalty based on consumers' "unwillingness to give up" certain brand of product, service or media.

The methodology on the deep analytical complexity of quantifying "right-brain" mother/child loyalty. It is an application that is executed before a consumer makes a purchase and therefore, is used as a predictor of loyalty (instead of after-the-fact regression models based on historical data). Additionally, the approach is cross-industry in its application. The key concept of the disclosed methodology is to pose to a consumer the following question: "On a scale of 0 to 10, where "10" means you are unwilling to give up (insert test variable) and "0" means you are willing to give up (insert test variable)", how would you rate (insert test variable)?" In one example embodiment, this and other related questions may be provided to the consumer via one or more electronic or online surveys and the survey results may be processed by a computer system to quantify the consumers' loyalty to a specific brand.

The key metric/question may appear deceivingly simple, but its creation and invention, have taken all the complexity of a dynamic marketplace and harnessed it into one powerful standard for evaluating consumer loyalty based on behavioral human "truth". The metric has been indicative of industry sales return-on-investment (ROI) data.

This metric/question provides quantitative measure of consumer brand loyalty based on emotional attachment to the brand. The measured consumer brand loyalty and other data as described herein, are applicable to commercial uses such as, advertising, marketing, valuation of consumer products or brands, product research and development.

In one example embodiment, a method for brand marketing comprises presenting to a consumer a first electronic survey including at least one first question measuring consumer's loyalty to a plurality of different product brands. The first question is whether the consumer is unwilling to give up each of the product brands. The method further comprises receiving consumer's first response to the first survey, wherein the first response indicates consumer's unwillingness to give up each of the product brands. The method further includes quantifying consumer's loyalty to the product brand based on the consumer's first response; consumer's loyalty indicates consumer's emotional attachment to the product brand. The method further includes presenting to the consumer a second electronic survey including at least one second question measuring consumer's loyalty to a plurality of different media brands, the second question being whether the consumer is unwilling to give up each of the media brands. The method further includes receiving consumer's second response to the second survey, wherein the second response indicates consumer's unwillingness to give up each of the media brands. The method further includes quantifying consumer's loyalty to the media brand based on the consumer's second response. The method further includes establishing correlations between the consumer's loyalties to the product brand and the consumer's loyalties to the media brands. Finally, the method includes, based on brand correlations, pairing the product brand having the highest consumer's loyalty to the media brand having the highest consumer's loyalty for brand marketing and other purposes.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to preset one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings:

FIG. 10 depicts the data sample of quantified consumers' brand loyalty of FIG. 9 further categorized according to a consumer demographic;

FIG. 12 depicts an electronic survey in accordance with one embodiment.

DETAILED DESCRIPTION OF EXAMPLE EMBODIMENTS

The present invention provides computer-implemented systems and methods for quantitatively measuring consumers' product brand loyalty based on consumers' emotional attachment to the brand. Brand is used herein to refer to a consumer product brand, for example, a trademarked brand that indicates the source of the consumer product, or other product identifier that indicates to a consumer the source, quality or other characteristic of the product. A consumer product includes, for example, goods and services, including media items such as magazines, movies or television shows, as well as famous persons, for example, a movie star or a politician, to whom a consumer may be loyal and/or has an emotional attachment.

In an example embodiment, consumer product brand loyalty is obtained based on an indication of emotional attachment to the consumer product brand. Emotional attachment to a consumer product brand is obtained according to a consumer's willingness to give up the brand. The consumer's willingness to give up a brand may be obtained posing a simple question: "how willing are you to give up a brand?" For example, the question may be based on a scale, such as a scale from one to ten, one representing that a consumer is very willing to give up a brand and ten representing that a consumer is entirely unwilling to give up a brand. FIG. 12 depicts an example electronic survey presenting such a question to the consumer and soliciting consumer's responses. Other measures for quantifying willingness to give up a brand may include for example, offering payment to a consumer to give up a brand for a specified time period, the time period and payment being quantified measures of brand loyalty, or an increased price that would cause the consumer to give up the consumer product brand, wherein the price differential (e.g. percentage increase) being a quantified measure of brand loyalty.

FIGS. 1-5 and 9 depict charts showing data sample of quantified consumer brand loyalty for different categories of products according to an embodiment of the invention. The sample product brands include, but are not limited to different fast food brands, different real estate brands, different brands of pasta, different brands of watches, different brands of auto after-care and usage of the Internet. These charts may be generated based on data collected using survey shown in FIG. 12, which quantifies consumer' brand loyalty and emotional attachment on a scale from one to ten. The data may be obtained from a large number of consumers for various products brands as shown in FIG. 12. The collected data may be used by individuals and companies, such as marketers, advertisers, company executives, to, for example, provide advertising targeted at particular consumers, evaluate existing marketing and advertising success, product research and development, product valuation, or other commercial use.

Figure 1:
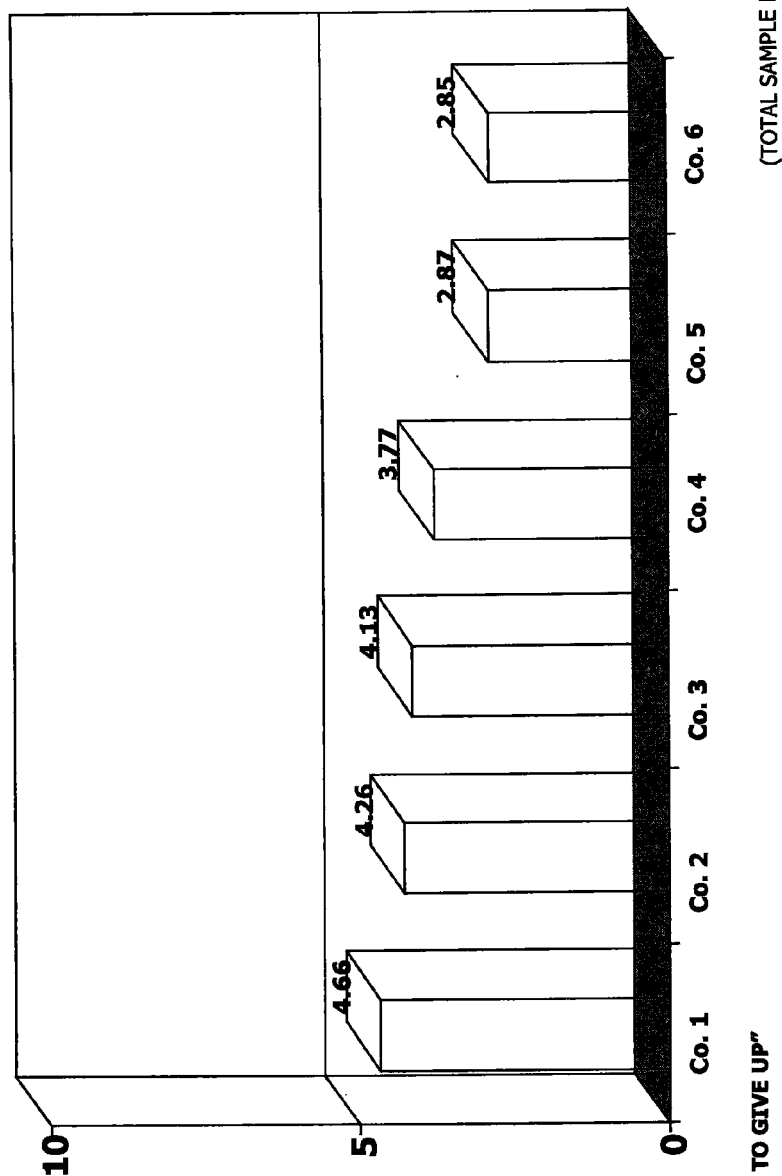
FIGS. 1-5, and 9 depict chart showing a data sample of quantified consumer brand loyalty for different categories of products/services according to an embodiment of the invention.
Figure 2:
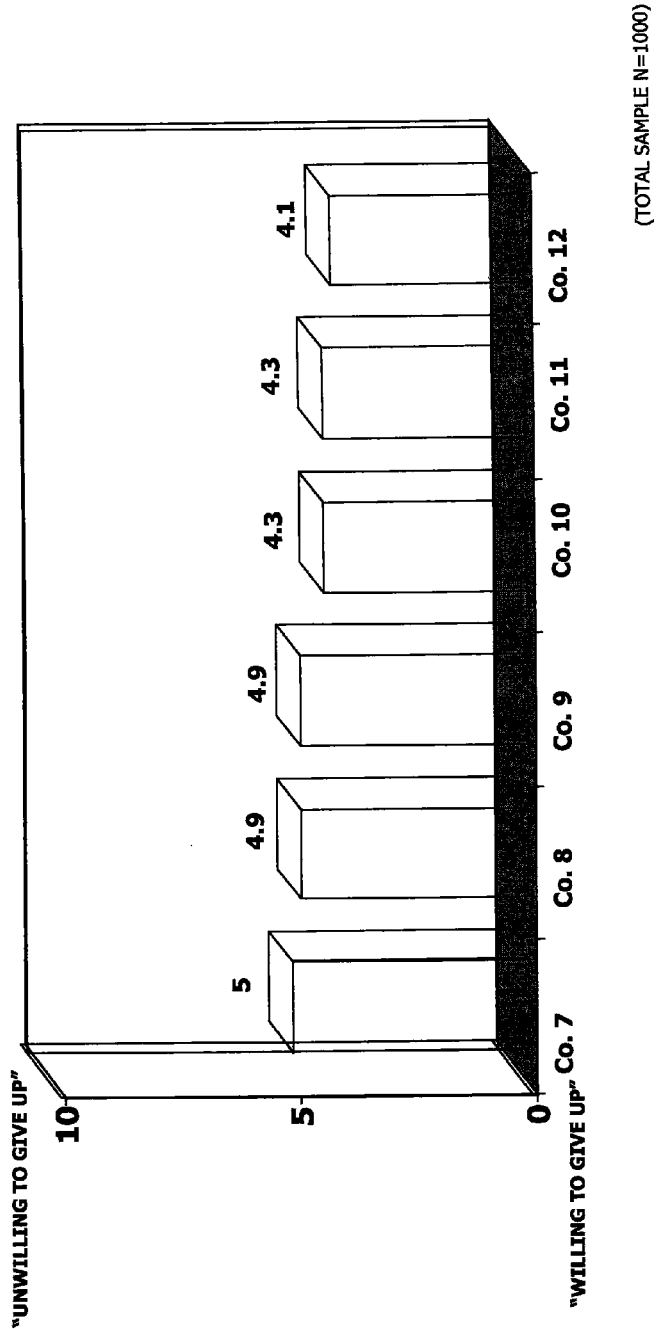
Figure 3:
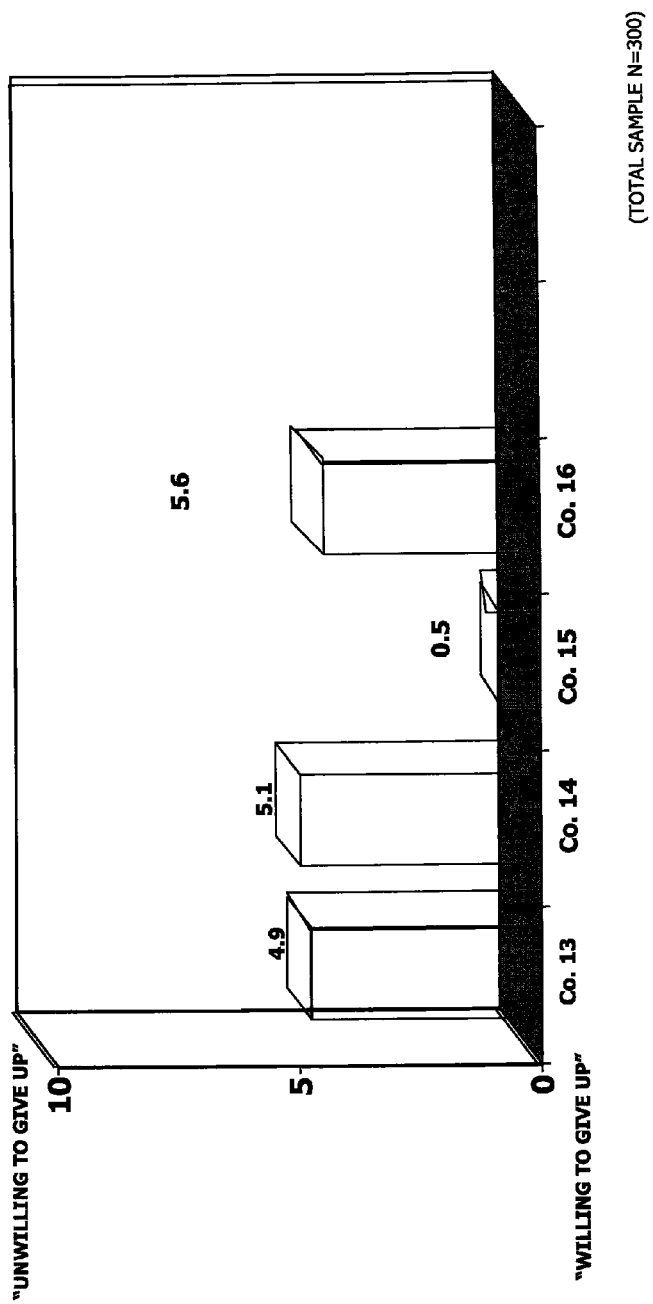
Figure 4:
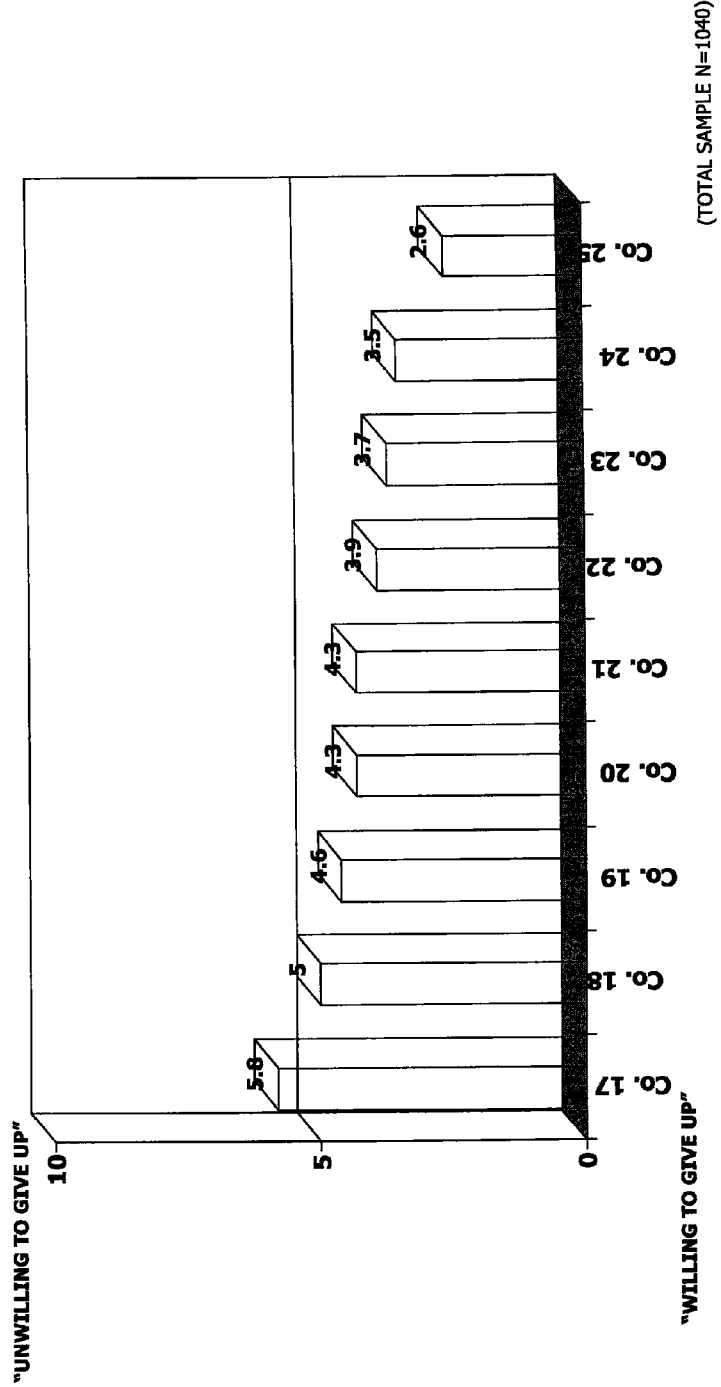
Figure 5:
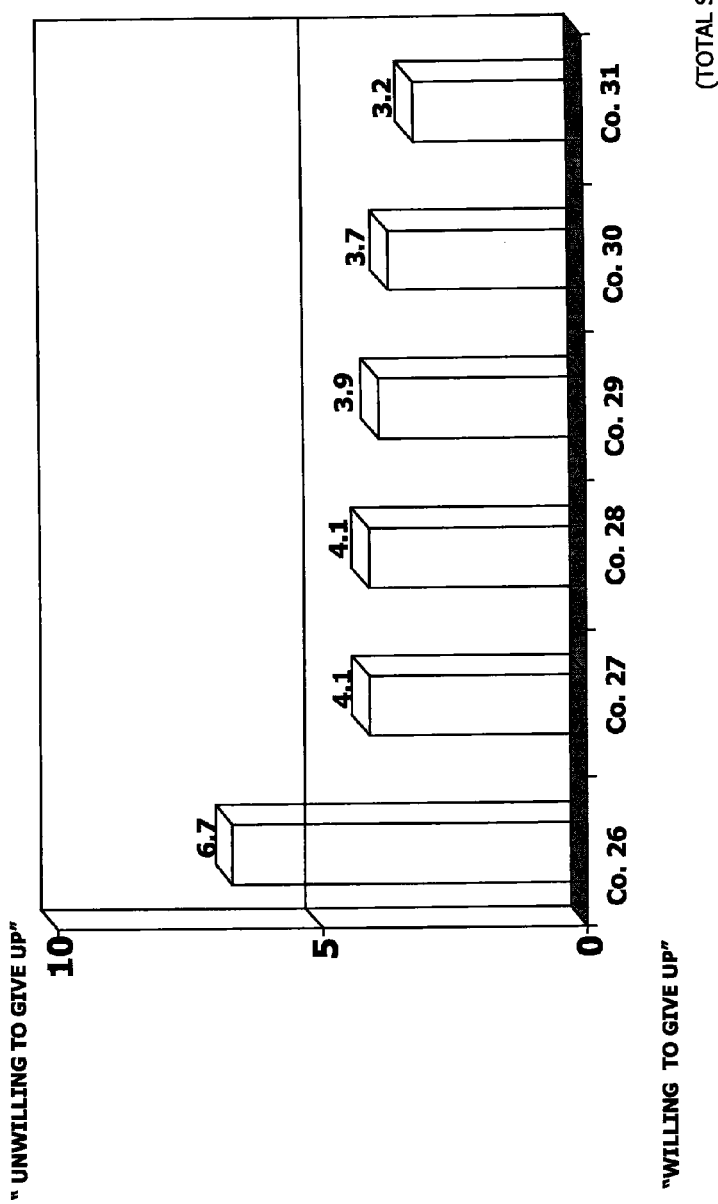
Figure 6:
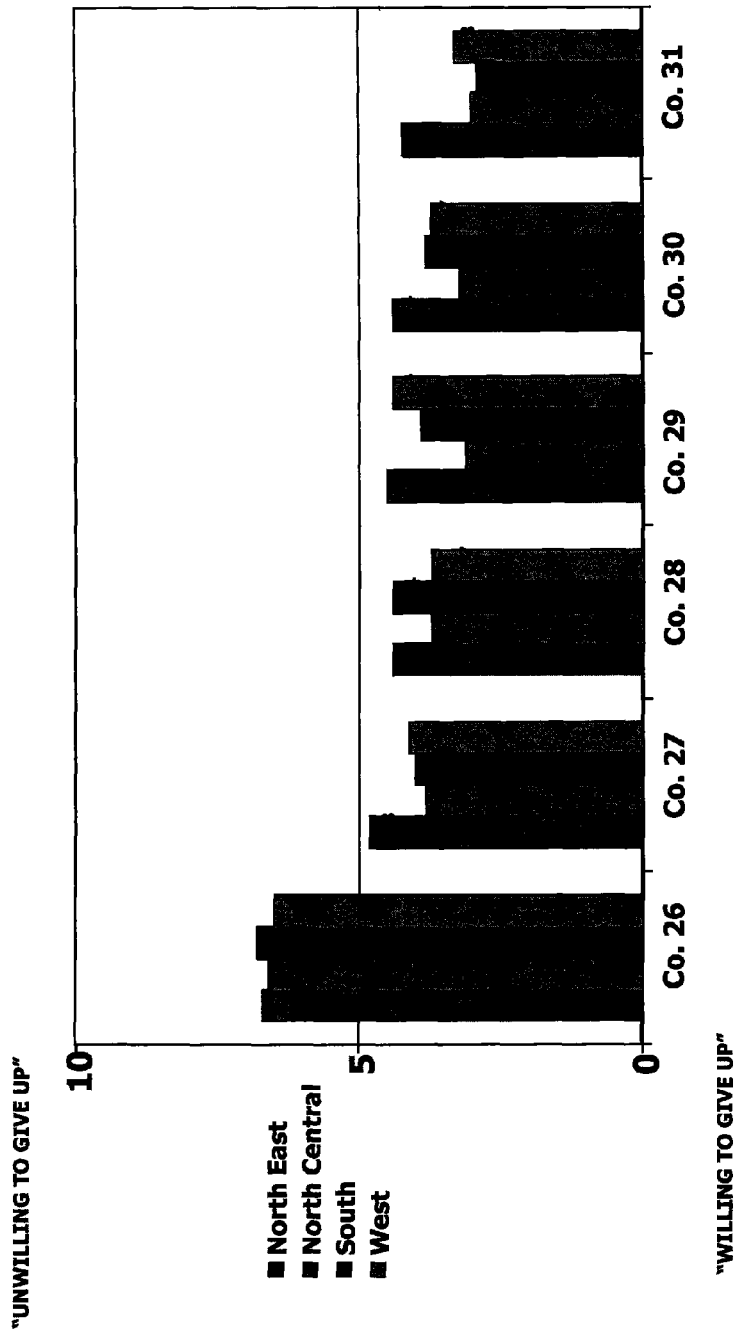
FIGS. 6-7 depict data samples of quantified consumers' brand loyalty of FIG. 5 further categorized according to a consumer demographic.
Figure 7:
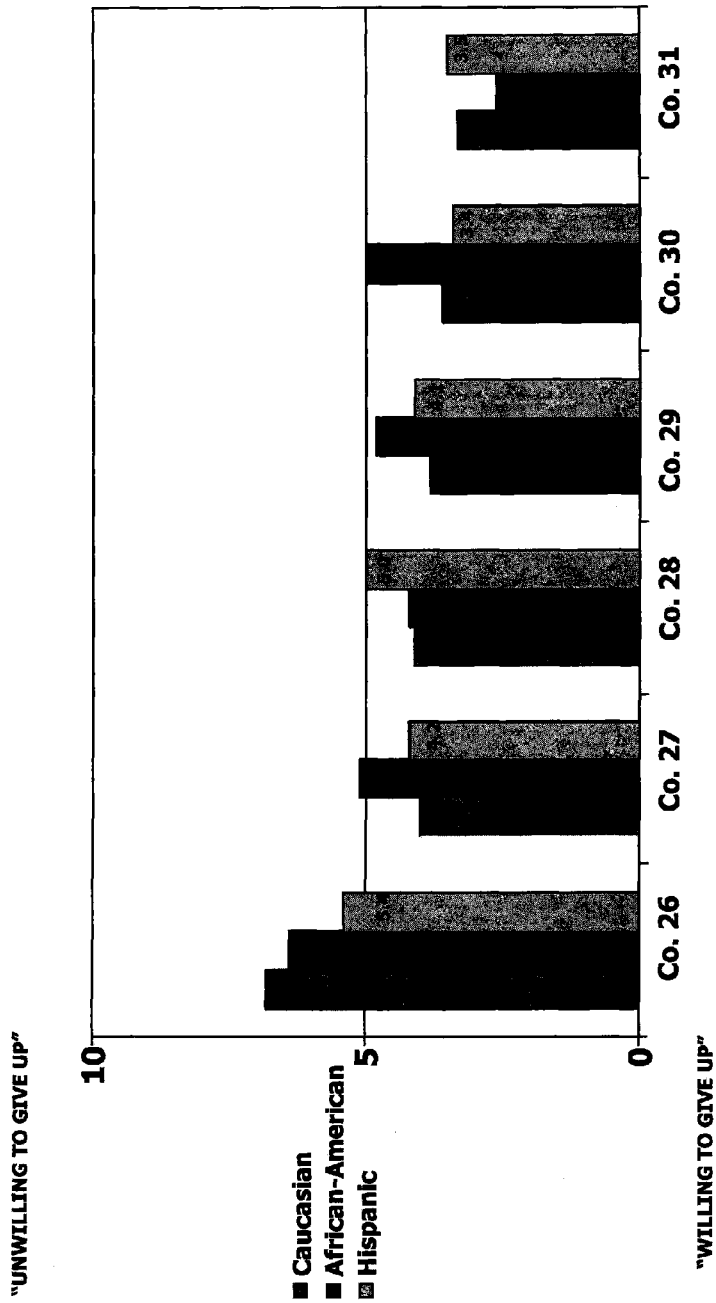
Figure 8:
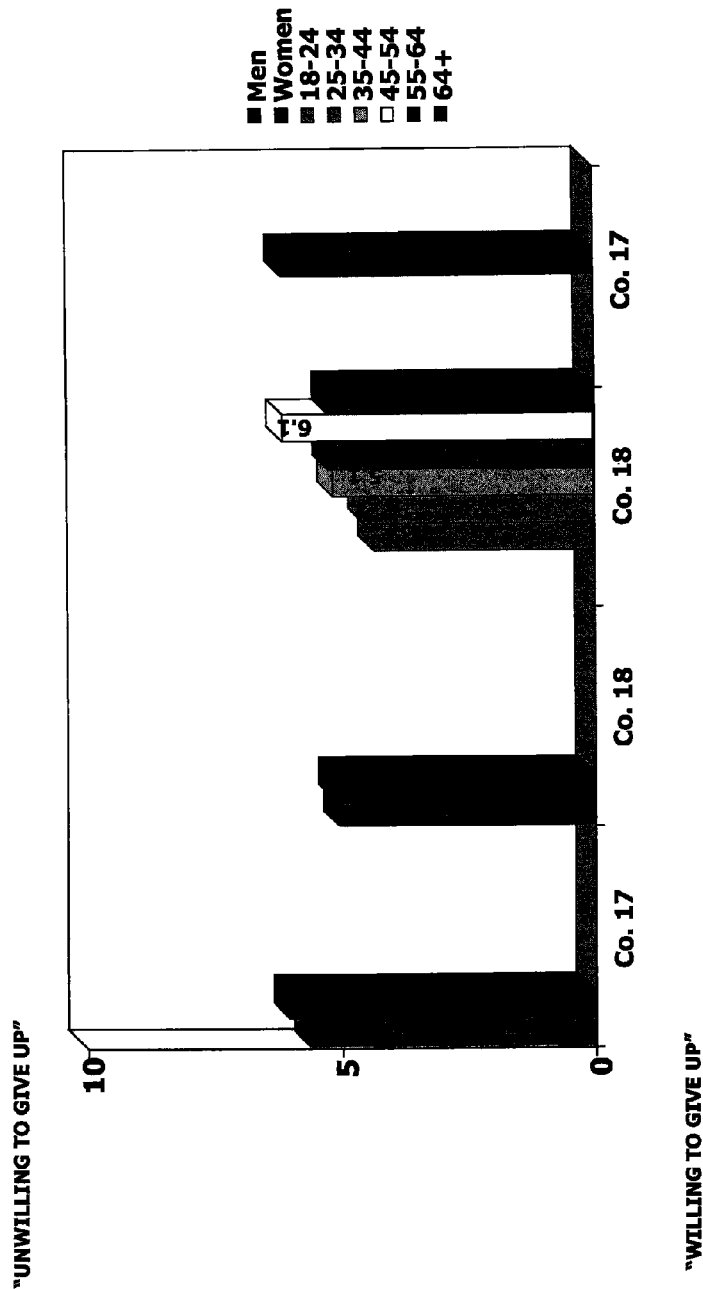
FIG. 8 depicts the data sample of quantified consumers' brand loyalty of FIG. 4 further categorized according to a consumer demographic.
Figure 9:
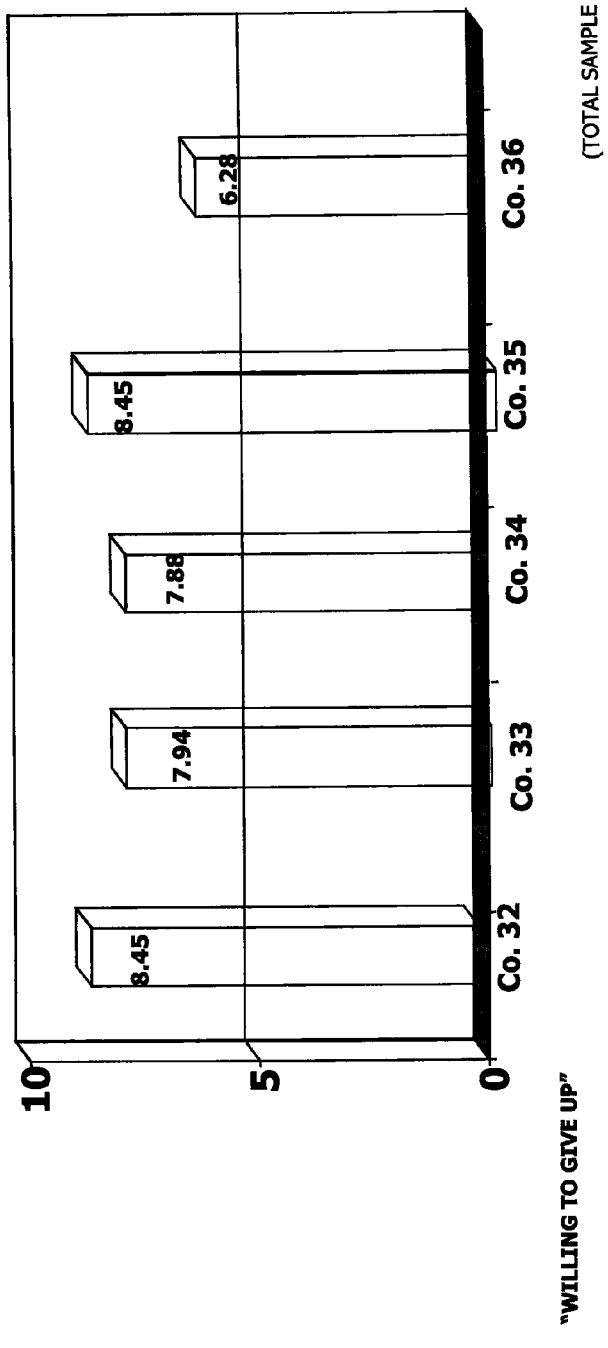

FIGS. 6-8 and 10 depict different categorizations of information about consumers' brand loyalty based on consumer demographic. In particular, FIG. 6 depicts data samples of quantified consumers' brand loyalty of FIG. 5 categorized according to geographic regions where surveys were conducted. FIG. 7 depicts data samples of quantified consumers' brand loyalty of FIG. 5 categorized according to ethnicity of consumers participating in the surveys. FIG. 8 depicts data samples of quantified consumers' brand loyalty of FIG. 4 further categorized according to a gender and age of consumers participating in the surveys. FIG. 10 depicts data samples of quantified consumers' brand loyalty to use of the Internet depicted in FIG. 9 further categorized according to various demographic factors of the surveyed consumers. These and other categorizations of consumers' brand loyalties provide context for consumer's brand loyalties and may be used to identify trends in consumer loyalty across the population.

In another embodiment of the invention, a method of measuring advertising, for example, the success of advertising, is provided including quantifying a consumer's loyalty to at least one consumer product brand. The quantified consumer loyalty is obtained, as described herein, based on the consumer's emotional attachment to a brand. Advertising for each of the at least one consumer product brand is quantified, for example, based on advertising expenditure, scope of advertising, streams of advertising, or other advertising measure. The data indicating the consumer loyalty and the associated advertising for each consumer product brand is compared to evaluate the success of the advertising for each brand in obtaining consumer loyalty. For example, this method would indicate whether particular streams of advertising may lead to greater consumer loyalty, such as a magazine or television program having a known and similar audience type. In another example, this method would indicate the impact advertising expenditure has on consumer brand loyalty.

In another embodiment of the invention, a method of advertising is provided in connection with the quantified consumer loyalty to a brand. The quantified consumer loyalty is obtained, as described herein, based on the consumer's emotional attachment to a brand. Participants are identified into categories of consumers according to demographics and consumer loyalty to the consumer product brand, and targeted advertising is provided towards those identified categories of consumers. For example, the identified categories of consumers may be those consumers having a relatively high consumer loyalty to the consumer product brand. Advertising is provided targeted towards the consumer demographic already loyal to the consumer product brand, for example, the consumers demographics having relatively high consumer loyalty according to FIGS. 6-8 and 10. Alternatively, the identified categories of consumers may be those having a relatively low consumer loyalty to the consumer product brand. Advertising is provided targeted towards the consumer demographic that are not loyal to the consumer product brand, for example, the consumers demographics having relatively low consumer loyalty according to FIGS. 6-8 and 10, to attract the interest of the consumers not loyal to the consumer product brand to the product brand.

In another embodiment, a method of evaluating the value of a future consumer product is provided in connection with the quantified consumer loyalty. The quantified consumer loyalty is obtained as described herein according to the consumer's emotional attachment for a brand similar to a future consumer product. Categories of consumers are identified according to the consumer's relative brand loyalty to the consumer product brand that is similar to the future consumer product. The consumers may be further categorized according to demographics. The data obtained related to the consumer loyalty and categories of consumers is correlated and applied to evaluating a future consumer product. For example, similar characteristics of the consumer product brand and the future product are considered together with the categories of consumers loyal to the consumer product brand to forecast, for example, success or profitability based on the past success of the similar product brand and the ability of the consumers to consume, use or purchase the future consumer product.

In another embodiment of the invention, a method of evaluating several competing consumer product brands is provided in connection with quantifying consumer loyalty. A first consumer's loyalty to a first consumer product brand is quantified according to emotional attachment, as described herein. A second consumer's loyalty to a second consumer product brand is quantified according to emotional attachment, as described herein. The first and second consumer product brands are competing product brands, for example, the first and second products are in the same product space, used interchangeably, or otherwise compete in the marketplace. The data related to the consumer loyalty for each of the first and second competing product brands is obtained and compared to determine the relative value of each brand based on the loyalty of the brand's consumers, as depicted in FIGS. 1-5 and 9. In addition, categories of consumers may be identified according to demographics and the consumer's loyalty to each of the first and second competing product brands to provide additional data related to the value of the product brand, as shown in FIGS. 6-8 and 10. For example, a category of consumers having relatively higher disposable income or need for a product may indicate that their loyalty and related purchase and use of the product may be more valuable, indicating a higher relative value of the brand, than another category of consumers, for example, who may be highly loyal to the brand, but may not have the ability, resources or need to use or purchase the brand as frequently.

In another embodiment of the invention, a method for developing consumer products is provided in connection with quantifying the consumer's loyalty to several product brands. Preferably the product brands are ones having characteristics similar to the product being developed, such as, type of product, utility, target consumers, or other characteristic. The consumer's loyalty to the product brand is obtained based on the consumer's emotional attachment to the product brand, as described herein. The data related to the consumer's loyalty to each of the brands is considered to identify the product having relatively high consumer loyalty. Characteristics specific to the identified product may be incorporated or otherwise applied to developing of other product, for example, incorporating into the developing product characteristics of the identified product brand, for example, characteristics that may be attractive to a consumer. Additionally, the method for developing a new product brand, may further include identifying categories of consumers loyal to the identified product brand, for example, based on demographics and providing advertising targeted towards the identified categories of consumers for the developing consumer products.

In another embodiment of the invention, a method for media allocation for products brands based on consumer's emotional attachment to the brand is provided. In particular, consumer's emotional attachment may be used to select media brands for advertising different product brands. In addition, consumer's emotional attachment may be used to determine the value of media purchases for each product brand and may be used as an exchange rate to normalize the value of any given media property, such as TV shows, websites, magazines, apps on iPads, etc. When a brand owner is allocating money for media advertising, the emotional attachment variable(s) derived from the emotional attachment algorithm may be used to determine consumer's loyalty to different types of media to determine which media properties will yield the most optimal brand return on investment (ROI) for the brand owner.

For example, table below shows emotional attachment consumers' of Bounty® products to different types of media brands, such as different types of popular television series. As indicated in the table, 56% of surveyed Bounty® consumers are unwilling to give up watching CSI series (i.e., those consumers who selected 9s and 10s on the brand attachment survey); 34% of consumers are unwilling to give up Practice series; 47% of consumers are unwilling to give up Everyone Loves Raymond; and 27% are unwilling to give up Fraiser.

| CSI | Practice | Raymond | Frasier |
|---|---|---|---|
| 56% are 9/10's | 34% are 9/10's | 47% are 9/10's | 27% are 9/10's |

Based on the results of this analysis, CSI is the most preferred media brand for pairing with Bounty® brand for the purpose of marketing of Bounty® products and vice versa.

In one example embodiment, the following equation can be used to compute correlation between product and media brands:

$$(((\beta p \Omega \beta m)/\beta p)/(\beta p/\beta t))*100,$$

in which $\beta p$ is a number of consumers attached to a product brand; $\beta m$ is a number of consumers attached to a media brand; $\beta p \Omega \beta m$ is an intersection between consumers who are attached to both the product brand and media brand; and $\beta t$ is the total number of surveyed consumers. Therefore, the equation above determines the percentage of surveyed consumers of Brand h who are most unwilling to give up Brand h and most unwilling to give up Media h divided by the percentage of Brand h consumers who are attached to Brand h and multiplied by 100%. Other formulas may be used in alternative embodiments.

In one example embodiment, the computed brand correlation may be used as input to media model on a brand-by-brand basis to determine pairing (or partnering) of product and media brands for purpose of optimizing ROI for marketing of product brands using different types of media and vice versa.

For example, when a product brand owner is looking to partner with a media brand owner for sponsorship opportunities or co-op deals, the correlation of the two brands determined using the disclosed emotional attachment algorithm will help the product brand owner to assess the value of partnering with different media brands.

Another example of brand pairing is shown in table below, which shows results of correlation between emotional attachments of consumers of different credit cards and popular casual dining restaurant chains. As evidenced from the table, the most attaching relationship is between AMEX and Olive Garden brands. This is the strongest brand-to-brand partnership.

|  | Mastercard 9/10's % | Amex 9/10's % | Visa 9/10's % | Discovery 9/10's % |
|---|---|---|---|---|
| Red Lobster 9/10's | 42.5 | 25.2 | 34.7 | 29.0 |
| Olive Garden 9/10's | 35.6 | 52.6 | 43.7 | 22.0 |
| TGIF 9/10's | 21.9 | 22.2 | 21.6 | 49.0 |

In one example embodiment, a method for brand marketing comprises presenting to a consumer a first electronic survey including at least one first question measuring consumer's loyalty to a plurality of different product brand. The first question is whether the consumer is unwilling to give up each of the product brands. The method further comprising receiving consumer's first response to the first survey, wherein the first response indicates consumer's unwillingness to give up each of the product brands. The method further includes quantifying consumer's loyalty to the product brand based on the consumer's first response; consumer's loyalty indicates consumer's emotional attachment to the product brand. The method further includes presenting to the consumer a second electronic survey including at least one second question measuring consumer's loyalty to a plurality of different media brand, the second question being whether the consumer is unwilling to give up each of the media brands. The method further includes receiving consumer's second response to the second survey, wherein the second response indicates consumer's unwillingness to give up each of the media brands. The method further includes quantifying consumer's loyalty to the media brand based on the consumer's second response; consumer's loyalty indicates consumer's emotional attachment to the media brand. The method further includes establishing correlations between the consumer's loyalties to the product brand and the consumer's loyalties media brands. Finally, the method includes, based on brand correlations, pairing the product brand having the highest consumer's loyalty to the media brand having the highest consumer's loyalty for brand marketing purposes.

While the invention has been described and illustrated in connection with example embodiments, many variations and modifications as will be evident to those skilled in this art may be made without departing from the spirit and scope of the invention, and the invention is thus not to be limited to the precise details of methodology set forth above as such variations and modifications are intended to be included within the scope of the invention. Except to the extent necessary or inherent in the processes themselves, no particular order to steps or stages of methods described in this disclosure is implied. In many cases the order of process steps may be varied without changing the purpose, effect, or import of the methods described.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The various embodiments of algorithms for quantifying consumer brand loyalty disclosed herein may be implemented using hardware, software, firmware or a combination thereof and may be implemented in various computing systems, such as a general purpose personal computer (PC), a laptop computer, an application server and the like. In addition, the disclosed algorithms may be implemented on a distributed computing system comprising a plurality of networked server computers operating in parallel for the purpose of generating electronic or on-line consumer surveys, collecting consumer response data and processing the collected data in order to measure consumer brand loyalty.

Figure 11:
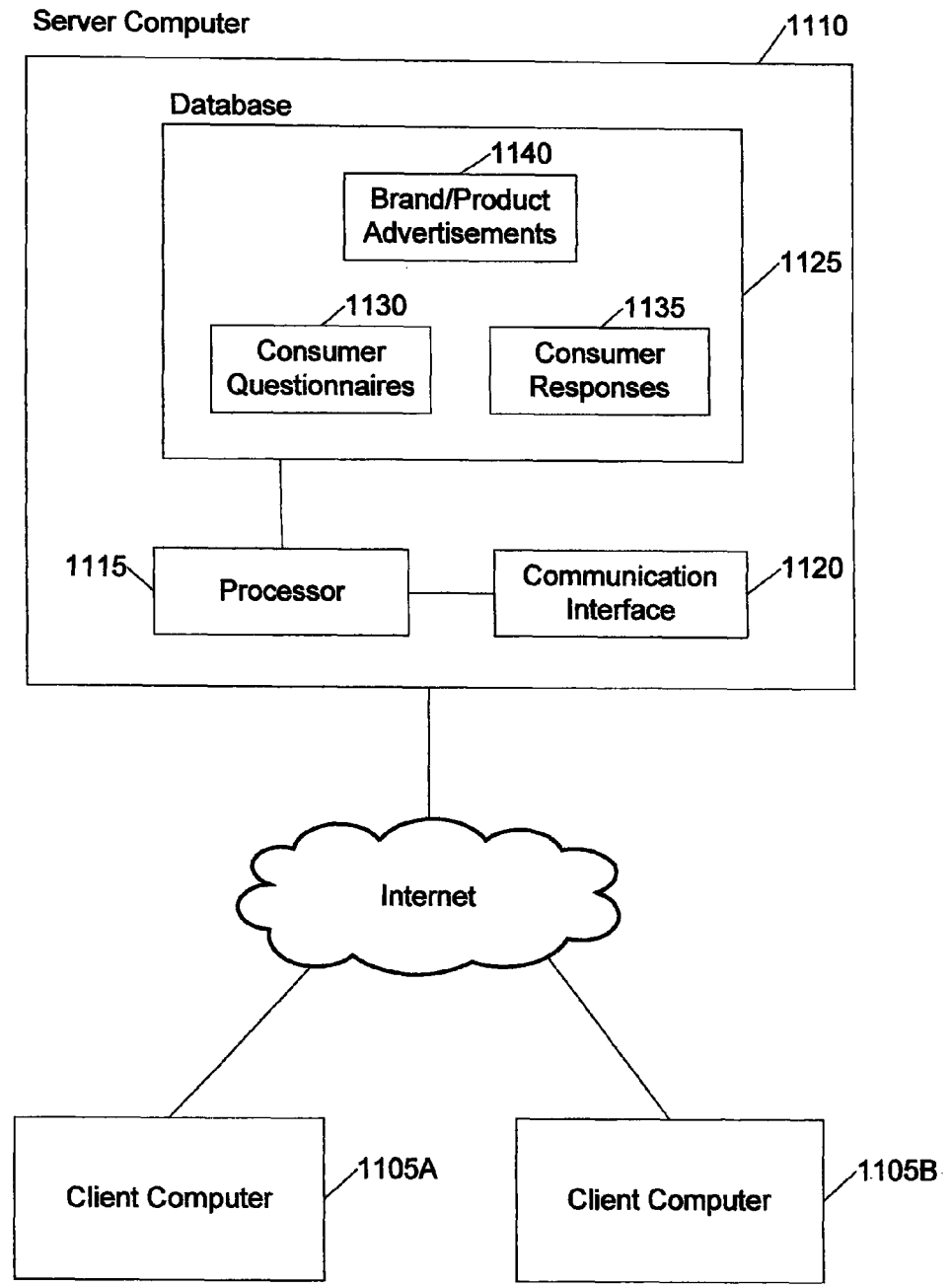
FIG. 11 depicts an example embodiment of a computer system for implementing the methods for quantifying consumer brand loyalty disclosed herein.

FIG. 11 is a block diagram that illustrates a networked computer system in which various embodiments of methods disclosed herein may be implemented. Computer system may include a plurality of client computers 1105 connected with a communication network, such as the Internet, to a server computer 1110. The server computer may be configured to generate various electronic surveys that solicit consumer information about loyalty to various brands, such as a survey illustrated in FIG. 12, and to quantifying a consumer's loyalty to a brand based on consumer's response to the surveys, wherein loyalty is indicated by the consumer's emotional attachment to the product brand.

More specifically, the server 1110 includes a processor 1115, a communication interface 1120 and a database 1125. The processor 115 may be a general purpose CPU configurable with program instructions for generating electronic surveys 1130 based on information stored in the database 1125 and for sending these surveys to the client computers 1105 via the communication interface 1120. The communication interface 1120 may include an Ethernet interface, for connecting the server 1110 to the client computer 1105 via the Internet. The survey 1130 may be XML-based document that is presented to the consumer via the Internet browser or other application running on the client computer 1105. The consumer responses 1135 to the survey 1130 are transmitted back to the server computer 1110 and stored in the database 1125. The processor 1115 is further configurable with program instructions for identifying categories of consumers based on consumers' responses to the electronic survey and providing brand advertisements 1140 targeted towards the identified categories of consumers in accordance with principles disclosed herein.

The computer executable instructions may be stored in a computer-readable medium, such as non-volatile media, volatile media and transmission media. Non-volatile media include, for example, optical or magnetic disks. Volatile media include, for example, dynamic memory. Transmission media include, for example, coaxial cables, copper wire, fiber optic cables, and waves that travel through space without wires or cables, such as acoustic waves and electromagnetic waves, including radio, optical and infrared waves. Common forms of computer-readable media include, for example, a floppy disk, a flexible disk, a hard disk, a magnetic tape, or any other magnetic medium, a compact disk ROM (CD-ROM), a RAM, a programmable ROM (PROM), an erasable PROM (EPROM), a FLASH-EPROM, or any other memory chip or any other medium from which a computer can read.

In the foregoing specification, the invention has been described with reference to specific embodiments thereof. It will, however, be evident that various modifications and changes may be made thereto without departing from the broader spirit and scope of the invention. For example, the methodologies disclosed herein may be used to quantify consumer loyalty to other things such as media types, e.g., TV, Radio, Internet, etc. The specification and drawings are, accordingly, to be regarded in an illustrative rather than a restrictive sense.

What is claimed is:

1. A computer-implemented method for brand marketing, the method comprising:
   providing to a consumer a first electronic survey including at least one first question measuring consumer's loyalty to a plurality of different product brands, the first question being whether the consumer is unwilling to give up each of the product brands;
   receiving consumer's first response to the first survey, wherein the first response indicates consumer's unwillingness to give up each of the product brands;
   quantifying, by a hardware processor, consumer's loyalty to the product brand based on the consumer's first response, consumer's loyalty indicates consumer's emotional attachment to the product brand;
   providing to the consumer a second electronic survey including at least one second question measuring consumer's loyalty to a plurality of different media brands, the second question being whether the consumer is unwilling to give up each of the media brands;
   receiving consumer's second response to the second survey, wherein the second response indicates consumer's unwillingness to give up each of the media brands;
   quantifying, by the hardware processor, consumer's loyalty to the media brand based on the consumer's second response, consumer's loyalty indicates consumer's emotional attachment to the media brand;
   establishing, by the hardware processor, correlations between the consumer's loyalties to each of the product brands and the consumer's loyalties to each of the media brands,
   wherein a correlation between product and media brands is computed, by the hardware processor, using equation:

$((( \beta p \Omega \beta m)/\beta p)/(\beta p/\beta t))*100\%$, in which $\beta p$ is a number of consumers attached to a product brand; $\beta m$ is a number of consumers attached to a media brand; $\beta p \Omega \beta m$ is an intersection between consumers who are attached to both the product brand and media brand, and $\beta t$ is the total number of surveyed consumers; and
   based on brand correlations, pairing, by the hardware processor, the product brand having the highest consumer's loyalty to the media brand having the highest consumer's loyalty for brand marketing purposes.

2. The method of claim 1, wherein each question includes an answer scale indicating consumer's unwillingness to give up a brand.

3. The method of claim 2, wherein the scale is from 0 to 10.

4. The method of claim 1, wherein the consumers attached to a brand include consumers who selected 9s and 10s on the answer scale.

5. The method of claim 1 further comprising:
   generating an advertisement of a product brand for use in the paired media brand; and
   sending the generated advertisements to consumers attached to the paired brands.

6. A computer system for brand marketing, the system comprising a memory and a hardware processor, the processor being configured to:
   provide to a consumer a first electronic survey including at least one first question measuring consumer's loyalty to a plurality of different product brands, the first question being whether the consumer is unwilling to give up each of the product brands;
   receive consumer's first response to the first survey, wherein the first response indicates consumer's unwillingness to give up each of the product brands;
   quantify consumer's loyalty to the product brand based on the consumer's first response, consumer's loyalty indicates consumer's emotional attachment to the product brand;
   provide to the consumer a second electronic survey including at least one second question measuring consumer's loyalty to a plurality of different media brands, the second question being whether the consumer is unwilling to give up each of the media brands;
   receive consumer's second response to the second survey, wherein the second response indicates consumer's unwillingness to give up each of the media brands;
   quantify consumer's loyalty to the media brand based on the consumer's second response, consumer's loyalty indicates consumer's emotional attachment to the media brand;
   establish correlations between the consumer's loyalties to each of the product brands and the consumer's loyalties to each of the media brands,
   wherein a correlation between product and media brands is computed using equation:

$((( \beta p \Omega \beta m)/\beta p)/(\beta p/\beta t))*100\%$, in which $\beta p$ is a number of consumers attached to a product brand; $\beta m$ is a number of consumers attached to a media brand; $\beta p \Omega \beta m$ is an intersection between consumers who are attached to both the product brand and media brand, and $\beta t$ is the total number of surveyed consumers; and
   based on brand correlations, pair the product brand having the highest consumer's loyalty to the media brand having the highest consumer's loyalty for brand marketing purposes.

7. The system of claim 6, wherein each question includes an answer scale indicating consumer's unwillingness to give up a brand.

8. The system of claim 7, wherein the scale is from 0 to 10.

9. The system of claim 6, wherein the con mers attached to a brand include consumers who selected 9s and 10s on the answer scale.

10. The system of claim 6, wherein the processor further configured to:
   generate an advertisement of a product brand for use in the paired media brand; and
   send the generated advertisements to consumers attached to the paired brands.

11. A computer program product embedded in a non-transitory computer-readable storage medium, the computer-readable storage medium comprising computer-executable instructions for brand marketing, the medium comprises instructions for:
  providing to a consumer a first electronic survey including at least one first question measuring consumer's loyalty to a plurality of different product brands, the first question being whether the consumer is unwilling to give up each of the product brands;
  receiving consumer's first response to the first survey, wherein the first response indicates consumer's unwillingness to give up each of the product brands;
  quantifying, by a hardware processor, consumer's loyalty to the product brand based on the consumer's first response, consumer's loyalty indicates consumer's emotional attachment to the product brand;
  providing to the consumer a second electronic survey including at least one second question measuring consumer's loyalty to a plurality of different media brands, the second question being whether the consumer is unwilling to give up each of the media brands;
  receiving consumer's second response to the second survey, wherein the second response indicates consumer's unwillingness to give up each of the media brands;
  quantifying, by the hardware processor, consumer's loyalty to the media brand based on the consumer's second response, consumer's loyalty indicates consumer's emotional attachment to the media brand;
  establishing, by the hardware processor, correlations between the consumer's loyalties to each of the product brands and the consumer's loyalties to each of the media brands,
  wherein a correlation between product and media brands is computed using equation:

$$(((\beta p \Omega \beta m)/\beta p)/(\beta p/\beta t))*100\%,$$

in which p is a number of consumers attached to a product brand; $\beta m$ is a number of consumers attached to a media brand; $\beta p \Omega \beta m$ is an intersection between consumers who are attached to both the product brand and media brand, and $\beta t$ is the total number of surveyed consumers; and
  based on brand correlations, pairing, by the hardware processor, the product brand having the highest consumer's loyalty to the media brand having the highest consumer's loy for brand marketing purposes.

12. The medium of claim 11, wherein each question includes an answer scale indicating consumer's unwillingness to give up a brand.

13. The medium of claim 12, wherein the scale is from 0 to 10.

14. The medium of claim 11 wherein the consumers attached to a brand include consumers who selected 9s and 10s on the answer scale.

15. The medium of claim 11 further comprising instructions for;
  generating an advertisement of a product brand for use in the paired media brand; and
  sending the generated advertisements to consumers attached to the paired brands.

* * * * *